Sept. 15, 1953     E. W. KEY     2,651,874
FISHING VESSEL
Filed June 13, 1949     2 Sheets-Sheet 1
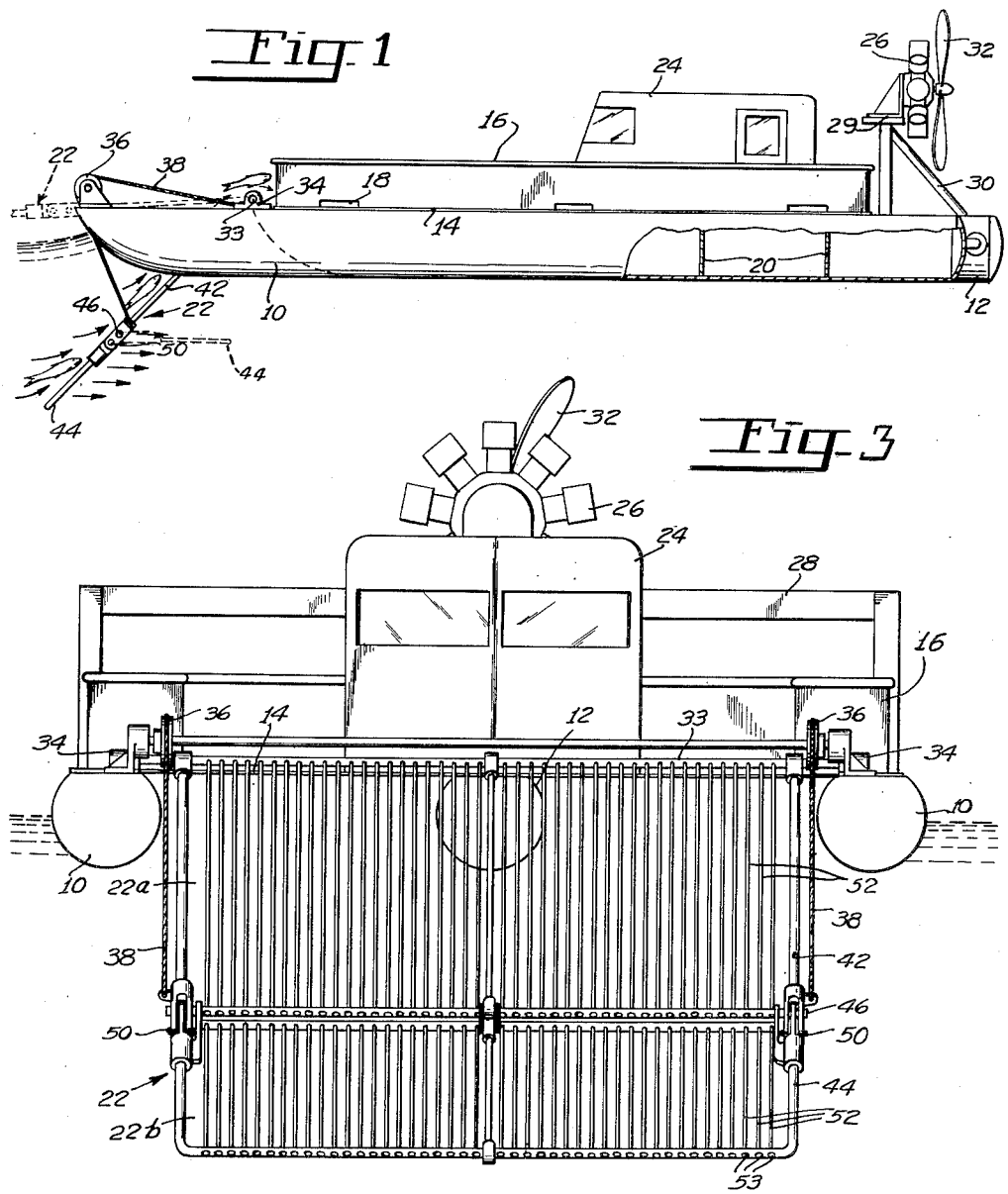
ELLIS W. KEY
INVENTOR.
REYNOLDS & BEACH
ATTORNEYS
BY Charles L. Reynolds

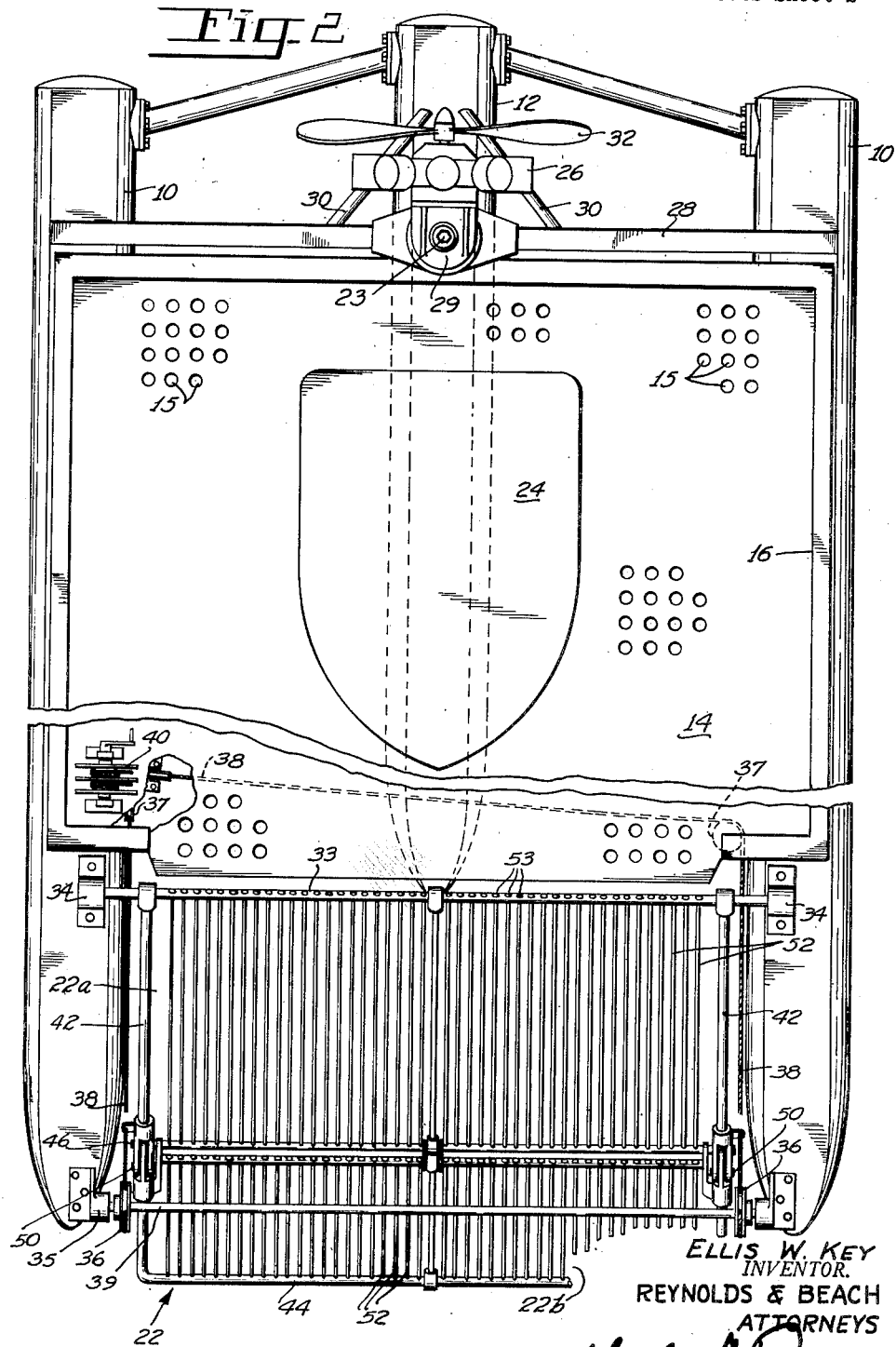

Patented Sept. 15, 1953

2,651,874

UNITED STATES PATENT OFFICE 2,651,874

FISHING VESSEL

Ellis W. Key, Eastside, Oreg., assignor of one-half to Earle R. Mandle, Seattle, Wash.

Application June 13, 1949, Serial No. 98,827

1 Claim. (Cl. 43—6.5)

This invention relates to a vessel which is designed to skim over the surface of water, with minimum water and air resistance and at high speed, and to a method of catching fish which are found in schools near the surface by taking advantage of the high speed of such a craft to intercept such fish while they swim, and to sweep them in one continuous motion, by the wash of the water and their own inertia, upon the vessel's deck. While so fishing the interception is accomplished by an inclined grid-like deflector or interceptor, angled downwardly and forwardly into the water from the vessel's bow, and which can be lifted from the water when the vessel is not fishing, so that the vessel's speed is not impeded thereby to any serious degree. Nevertheless, by a special and novel construction of the deflector, the latter when in the water imposes but slight drag, so that speeds as high as 30 to 50 knots per hour are readily attained by a skimming vessel such as this without the use of excessive power. Such speeds enable the vessel to approach and pass through a school of fish before the fish can swim out of the deflector's path, yet damage to the intercepted fish by impact of the deflector against them is negligible because of the normally small angle of incidence of the deflector relative to the fish, and because such water resistance as the deflector generates creates an upward surge of water, and of the fish within the surging water, which not only lifts the fish and the water to fall on the vessel's deck, but also cushions and minimizes the impact of the fish both with the deflector and with the deck.

Earlier proposals have been made for catching fish by receiving and entrapping them in devices which are best described as forwardly flared, funnel shaped nets or traps mounted at the bow of the vessel. Cooperating with the net, it was usual in such cases to provide some sort of transfer means or collector, frequently including a mechanically operated conveyor, into which the fish passed or swam after entering the net, and by which they were transferred to the hold of the vessel. This type of apparatus was bulky and complex and would produce such heavy drag upon the vessel that the complete apparatus could function primarily only as a mobile fish trap, relying not chiefly upon the speed of the vessel to overtake and catch fish but upon the effectiveness of the trap to retain the fish erring into it.

Moreover, reliance solely upon the speed of the vessel for carrying the fish intercepted continuously into or upon a receiving deck of the vessel would not be possible in those cases, for the design of such vessels made them inherently incapable of high speed, and the design of the collecting funnel was such as would slow down a vessel too greatly even though the vessel might have been inherently capable of high speed.

Contrasted with these earlier proposals my present invention contemplates not merely propelling a deflector or fish interceptor through a school of fish, or a location where fish may be found, at a speed materially higher than speeds heretofore used or attained in fishing, so as actually to overtake and intercept the fish despite their attempts at escape, but also preferably utilizes directly the effects of such speed and of the added drag of the deflector, even though small, to carry the fish out of the water and to deposit them in a continuous motion upon the adjoining low-placed receiving or storage deck of the vessel.

In conjunction with this type of operation a further important object is to establish an upward surge of water ahead of the inclined deflector effectively to cushion the impact of the fish thereon, or to give them an upward impetus before any actual impact with the deflector occurs. Damage to the meat is thereby further prevented despite the high operating speeds of the vessel and the fish are lifted above deck level, whereupon as they drop they fall upon the deck which follows closely behind the deflector. No other provision for elevating the fish from the water is required, and much complication of conveyors, and other related parts is eliminated.

With this in mind an important feature of my invention is the combination of a special high-speed craft and a novel low-drag type fish deflector, as hereinatfer described, for use in conjunction with the improved method.

Apart from considerations of high speed, the preferred type of vessel employed in the practice of the invention is one which is constructed for shallow draft for skimming swiftly without danger over shoals and sand bars, where the salmon and other school fish will frequently be found. In this same connection the novel fish deflector carried at the bow of such vessel is of articulated construction, having a lower section which is hinged to an upper section for swinging about an intermediate transverse horizontal axis. These sections are normally coplanar and are so held by a shear pin or other stress-relief device. However, such a device releases the lower section for swinging relative to the upper section to prevent damage should the former strike a reef or other underwater obstacle.

Apart from considerations of collecting the fish, this type of vessel is of such slight draft and low profile that its air and water resistance is low, hence it is well suited to transport the catch (or any cargo it may carry) at high speed to a market, quickly discharge the catch (for it will not be large in terms of tons) while still fresh, and return at high speed to the fishing area. Many advantages arise as a result of such capabilities; the catch is marketed when out of the water only a matter of hours, and no provision for storing, icing, or other handling is needed; the vessel can readily return to, and may be expected to lay overnight in port, hence but minimum provision for sleeping accommodations is required; what the vessel may lack in cargo capacity (and a surprisingly large quantity of fish can be collected, using the entire deck area) is made up by its ability to make numerous trips between the fishing area and port at high speed in the time it would take a conventionally designed vessel to make a single round trip, and by the greatly decreased cost of such a vessel that requires little in the way of gear, or crew quarters, and no storage space other than the deck whereon the fish fall as they are scooped up. Because the vessel is frequently in port, no large fuel tanks are required; its fuel supply can be replenished while its cargo is being discharged. Such a vessel is highly mobile, and can range over a large area of ocean, to find or to follow a run of fish.

The foregoing and other features, objects and advantages of the invention, including certain details of the preferred form of the apparatus, will be made more apparent from the following description based upon the accompanying drawings.

Figure 1 is a side view of the novel fishing apparatus; Figure 2 is a plan view thereof; and Figure 3 is an end view, looking at the bow of the vessel.

Figure 4 is a cross-sectional view of an alternative form of one grid element or rod used in the construction of the novel fish deflector.

As herein illustrated, my novel fishing craft is floated by elongated, parallel side pontoons 10 and one or more parallel intermediate pontoons 12 preferably of a shorter length or carried with their front ends offset astern relative to the side pontoons of the vessel for a purpose to be explained. The pontoons, thus arranged, are decked over by sheeting 14 preferably of a light noncorrosive metal, such as duralumin, leaving a low freeboard. The deck of the vessel has a rail and bulwark 16 along its two opposite sides and its stern, but is open at the bow end, so that in effect the bulwarks and deck of the vessel form a three-sided storage container into which fish are deposited automatically during fishing operations.

Preferably the decking is perforated by apertures 15 located at intervals over most of its area (Figure 2) so that water washed upon it can strain off through the perforations without loss of any fish which may be deposited thereon. Scuppers 18 aid in removing deck wash. Deck beams and other suitable reinforcing structure necessary to the strengthening of the craft are not illustrated in the drawings, being a matter of design detail.

Propulsion of the vessel at high speed is essential while fishing, and is highly desirable during runs from and to the fishing areas. Being of shallow draft and of low freeboard, the vessel's air resistance is further minimized by using a small cabin 24, low to the deck 14, and located centrally towards the after end, whereby the greater area of the deck is available to receive and collect fish, for the vessel has no hold. The propelling engine 26 may well be of the aircraft type, driving a pusher airscrew 32, and is mounted aft upon superstructure including the transverse beam 28 and braces 30. The engine mount 29 is pivoted at 23 upon this superstructure, whereby the thrust axis of the propeller may be turned, by any suitable or conventional steering mechanism, not necessary to show in detail, to one side or the other, to steer the vessel. The steering arrangement is not, in itself a part of the invention, and more conventional steering means would normally be provided (but are not shown herein) in order to enable maneuvering at low speed, in port.

The grid-like fish deflector 22 is formed preferably in two parts, an upper part 22a and a lower part 22b, referring to their disposition while in use. Each part includes a rigid marginal frame and rods or wires directed fore-and-aft only, stretched tightly between the transverse elements of the frame. The upper part, which is typical, includes the upper transverse shaft 33, the lower transverse element 46, the side frame elements 42, and the longitudinally directed wires or rods 52 stretched between the elements 33 and 46. Tightening elements 53 (identified in conjunction with the lower part 22b) of any suitable form enable each rod 52 to be kept taut.

The shaft 33 has its ends received in bearings 34 on the outer pontoons 10, at deck level. Thus, by mechanism to be described later, the grid 22 can be swung upwardly about the shaft 33 out of water, as shown in the upper dotted line position of Figure 1, or lowered thereinto at any desired angle of incidence, as shown in full lines in the same figure. The element 46 is also part of a pivotal mounting for the U-shaped frame 44 of the lower grid part 22b, whereby the latter may swing about the axis thus defined relative to the upper grid part 22a. Normally shear pins 50 interconnect the two grid parts to prevent any such relative movement, but should the lower part 22b encounter an underwater obstacle the shear pins 50 will yield before damage to the grid occurs, and the lower part 22b will swing harmlessly rearwardly, into the lower dotted line position of Figure 1.

The grid elevating and positioning mechanism may take any desired form. Typical of a satisfactory form is the winch 40 on deck 14, whence cables 33 extend over guide pulleys 37 to overhead sheaves 36 on a shaft 39 journaled at 35 at the forward ends of the pontoons 10, and thence downwardly to the frame elements 42 in the vicinity of the pivot at 46. These cables and the winch are used to adjust the inclination of the deflector relative to the water's surface, and support the deflector against downward swinging under the influence of its own weight or the force of the water against it as it is swept forwardly.

The deflector is lowered into operating position by release of the winch 40 to pay out the lift cables 38. A proper operating angle of the deflector will be in the vicinity of from 30 to 50 degrees, inclined downwardly and forwardly into the water relative to the deck or the water level. This angle may be increased or decreased but is preferably made as small as possible consistent with attaining a deflector depth which is great enough to intercept the fish at a particular time.

In a typical application of the invention, wherein the vessel is perhaps 65 feet long and in the vicinity of 25 feet in width, the deflector may be constructed about 15 feet in length, for example. When of that length and disposed at an inclination angle of 45 degrees it will project into the water to a depth of about 10 feet, less the vessel's freeboard, which is always low. When not in use it will be raised out of the water by the winch and lift cables 38 into its dotted-line traveling position shown in Figure 1.

The deflector rods 52 will be preferably from one-fourth inch to one-half inch in diameter and spaced apart from between one and one-half inches to two and one-half inches, or thereabouts, depending to an extent upon the type of fish being sought. They may be of round cross-section, but Figure 4 illustrates in cross section an alternative form of grid element or rod 52', formed by folding a flat metal strip into a tube of teardrop shape in cross section, the contacting edges of the strip being welded or brazed together. Such a grid element is light in weight and streamlined, while resistive to bending because of its oblong cross section extending normal to the plane of the deflector.

Few or no grid crosspieces are used in the formation of the intercepting grid structure, so that it differs from the mesh arrangement of a conventional net or fence; accordingly its frontally projected area, hence its drag, will be much less, viz., more than proportionately less because of the effect of inclination of the deflector on its frontally projected net area. Moreover, by omitting to the highest possible degree the use of crosspieces in the deflector, not only is the resistance or drag of the deflector in the water greatly reduced, but there are other important advantages to be gained thereby. For example, the structure can be made more cheaply of metal, light in weight and sturdy. The bodies of fish intercepted by and which might be pressed against the parallel grid elements by force of the water will slide freely along and be definitely guided upwardly by these grid elements, whereas if they engaged transverse grid elements they might be stopped or impeded thereby. Fish engaged only by the longitudinal rods 52 will not so readily slide off the deflector at its sides.

However, the fish deflector swept through the water at a high velocity—especially if some fish be pressed against it—has a sufficient frontally projected net area formed by its parallel inclined grid elements or rods 52 to cause the water in front of the deflector to surge upwardly in a wave which imparts an initial upward impetus to the fish in the path of the deflector before any actual impact occurs. As a result of this action of the water and also its cushioning effect the force or suddenness of the impact of the fish against the deflector is greatly diminished and likelihood of damage to the meat becomes negligible.

Fish carried upward by this wave continue to move up the deflector and are lifted above deck level. When they drop the rapidly advancing deck lies beneath them, and they are deposited in the wash from the deflector directly upon the adjoining deck of the vessel, which deck is sufficiently low or near to the water that the fish need not be lifted far to permit the deck to slip beneath the lifted fish the accompanying water received on deck further cushions impact of the fish with the deck, and then rapidly disappears through the scuppers 18 and deck perforations or openings 15, so that while the fore-part of the deck may, at least at times, be under a layer of water, the after part of the deck will not be. The fish deposited on the deck tend to slide aft in the deck wash and air stream, and collect and pile up on deck until a full cargo is collected, or the master decides to cease fishing.

The pontoons contain transverse partitions 20 forming watertight compartments for greater safety, and, if desired, for receiving water as a means of trimming the vessel to cause it to float at a desired attitude in the water, or for use as fuel tanks. For example, water may be introduced into the stern compartments to raise the bow of the vessel slightly in order to compensate for any tendency for the same to nose downward by the tendency of the fish deflector 22 to plow.

With my invention the high speed of the vessel enables traveling long distances to fishing grounds, and, after catching the fish, returning quickly to port or to a tender or cannery vessel without danger of spoilage. Moreover, with fishing conditions reasonably good a full catch can be made with slight labor and in a relatively short period of time, measured by usual standards.

I claim as my invention:

Fishing apparatus comprising a grid-like deflector generally of flat construction and having an articulated frame structure comprising upper and lower, hingedly interconnected sections, each supporting a grid formed by closely spaced parallel rods extending between opposite sides thereof but otherwise substantially open, stress-relief means normally interconnecting said frame sections to restrain swinging thereof, but yieldable to permit swinging of the lower section relative to the upper section when subjected to excessive stress tending to produce such swinging, means supporting said deflector to project, from a location close to the surface of the water, downwardly into the water at an acute angle of inclination to the water's surface in the direction of said parallel elements, and means to propel said supporting means and the deflector, thus supported, through and along the surface of the water, in the sense of the deflector's downward inclination, at a speed sufficiently high to intercept and wash fish upwardly and over the top of the deflector as a result of such speed and the inclination of the deflector, said supporting means including a receiver adjoining and aft of the top of said frame to receive such fish.

ELLIS W. KEY.

References Cited in the file of this patent

UNITED STATES PATENTS

| Number | Name | Date |
|---|---|---|
| 27,213 | Force | Feb. 21, 1860 |
| 1,012,065 | Duffy | Dec. 19, 1911 |
| 1,138,541 | Conekin | May 4, 1915 |
| 1,439,908 | Massey | Dec. 26, 1922 |
| 1,489,917 | Blecker | Apr. 8, 1924 |
| 1,606,668 | Rubach | Nov. 9, 1926 |
| 1,619,560 | Blecker | Mar. 1, 1927 |
| 1,703,402 | Matsuoka | Feb. 26, 1929 |
| 2,064,408 | Blecker | Dec. 15, 1936 |
| 2,341,866 | Higgins | Feb. 14, 1944 |

FOREIGN PATENTS

| Number | Country | Date |
|---|---|---|
| 465,085 | France | Apr. 7, 1914 |